Sheet 1-6 Sheets.

E. B. Bigelow.
Loom.

No. 146. Reissued Oct. 9, 1849.

E. B. Bigelow.

Loom.

Sheet 2-6 Sheets.

No. 146.

Reissued Oct. 9, 1849.

Sheet 3 - 6 Sheets.
E. B. Bigelow.
Loom.
No. 146. Reissued Oct. 9, 1849.
Fig: 10.
Fig: 9.
Fig: 8.
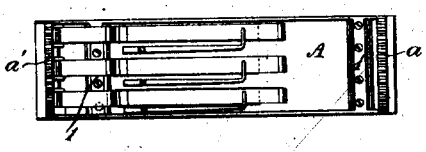
Fig: 11.
Fig: 3.
Fig: 5.
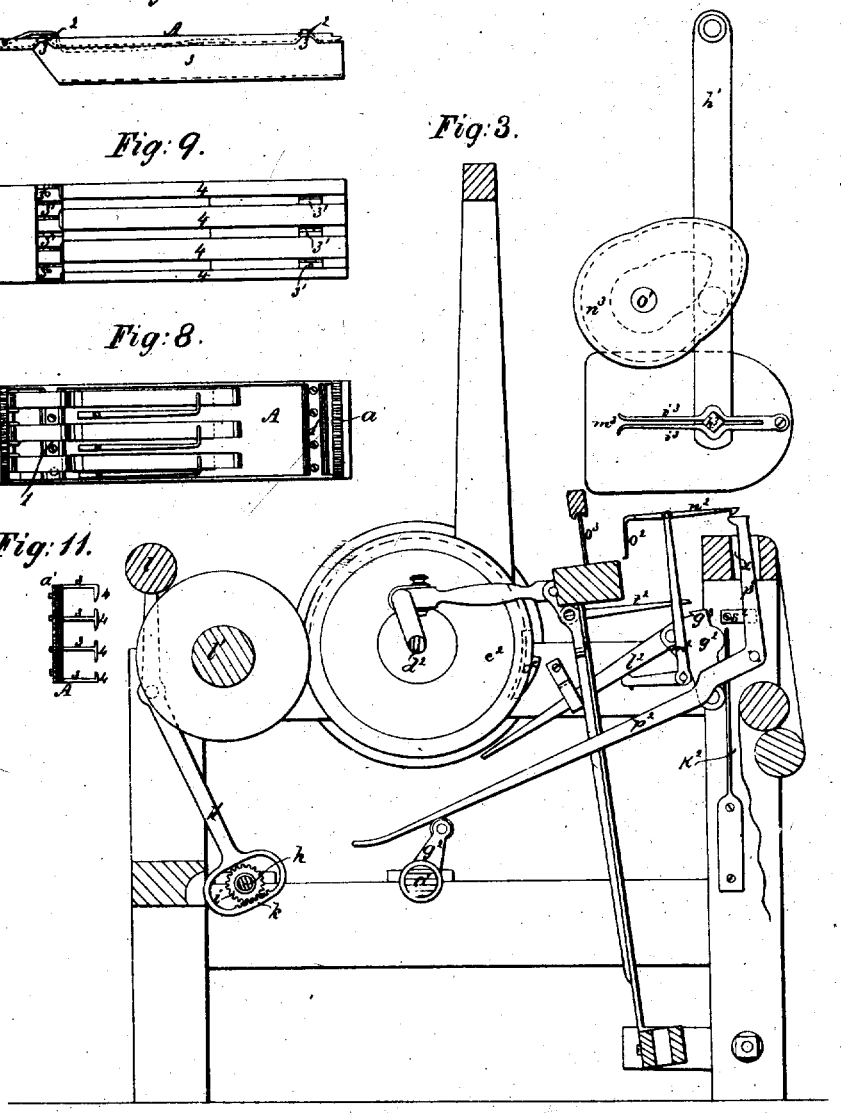

Sheet 4 - 6 Sheets.

E. B. Bigelow.
Loom.

No. 146. Reissued Oct. 9, 1849.

Sheet 5-6 Sheets
E. B. Bigelow.
Loom.
No. 146. Reissued Oct. 9, 1849.
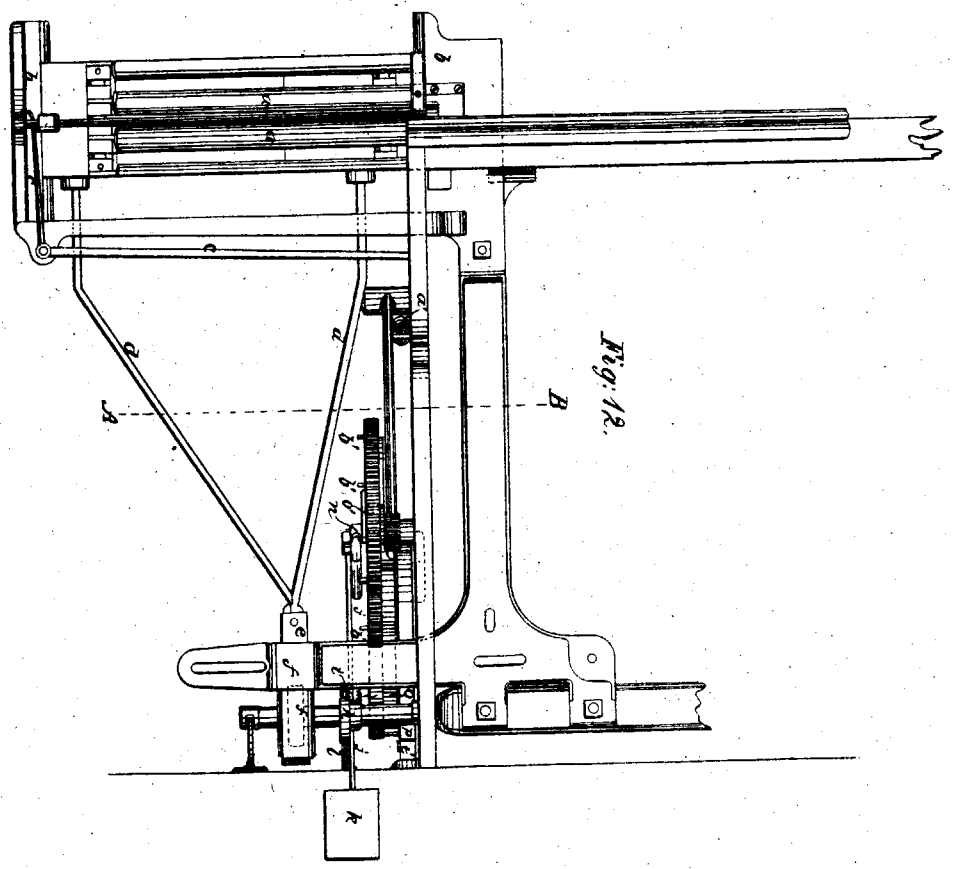

E. B. Bigelow.
Loom.

No. 146. Reissued Oct. 9, 1849.

UNITED STATES PATENT OFFICE.

ERASTUS B. BIGELOW, OF CLINTONVILLE, MASSACHUSETTS.

IMPROVEMENT IN POWER-LOOMS FOR WEAVING PLAIDS, &c.

Specification forming part of Letters Patent No. 3,987, dated April 10, 1845; Reissue No. 146, dated October 9, 1849.

*To all whom it may concern:*

Be it known that I, ERASTUS B. BIGELOW, of Clintonville, in the State of Massachusetts, have invented new and useful Improvements in Power-Looms for Weaving Plaids, Ginghams, and other Fabrics; and I do hereby declare that the following is a full, clear, and exact description of the principle or character which distinguishes it from all other things before known, and of the manner of making, constructing, and using the same, reference being had to the accompanying drawings, making part of this specification, in which—

Figure 1:
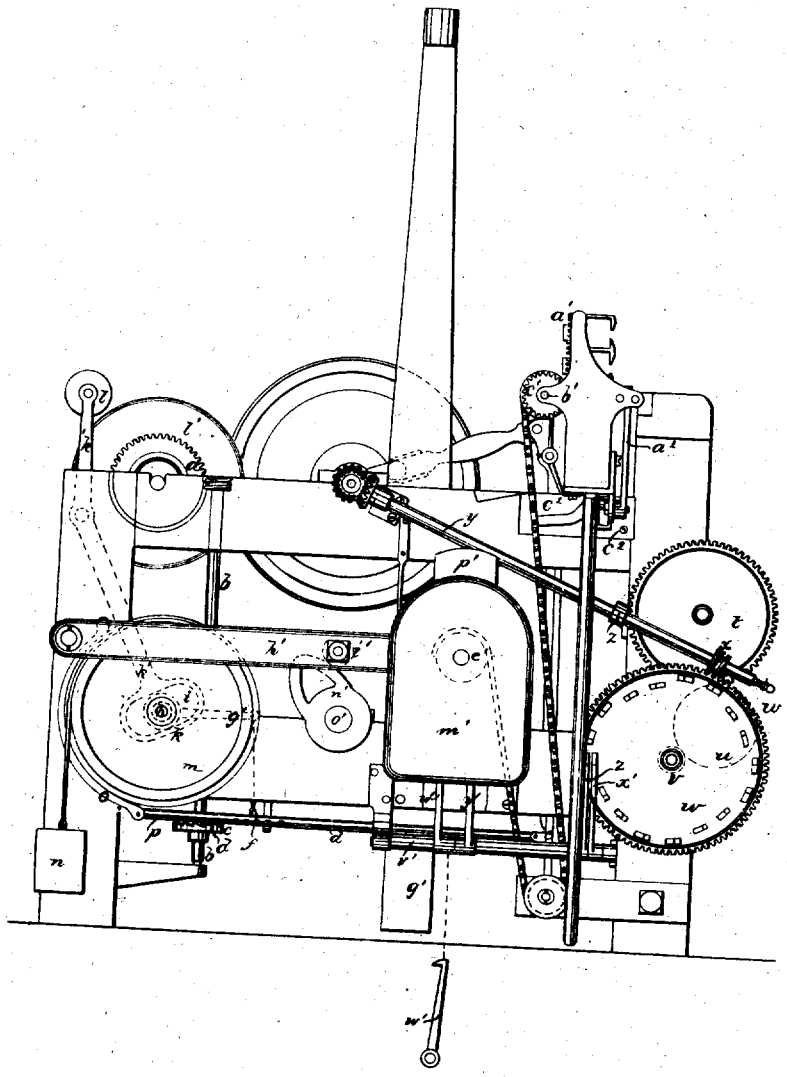
Figure 2:
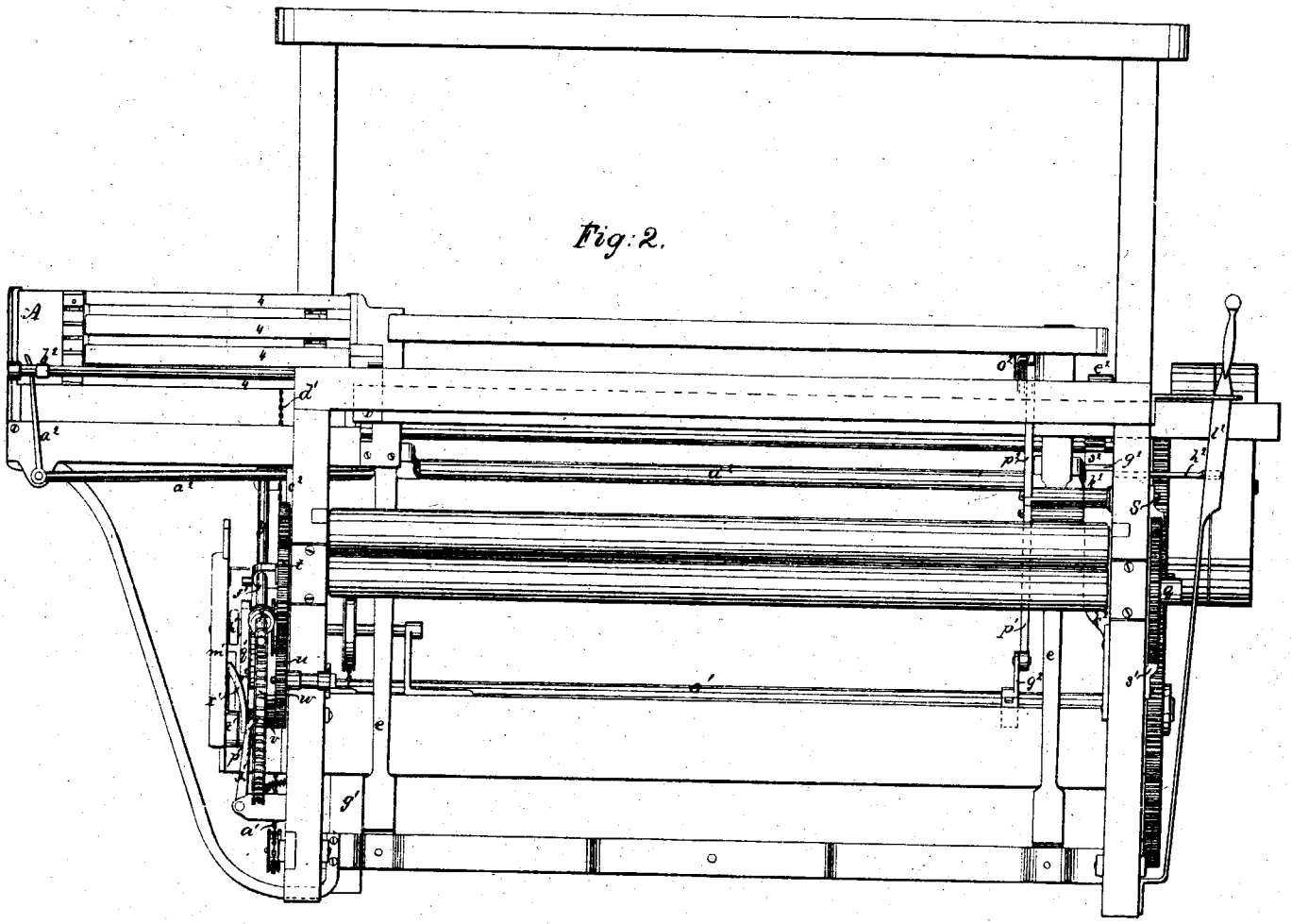
Figure 6:
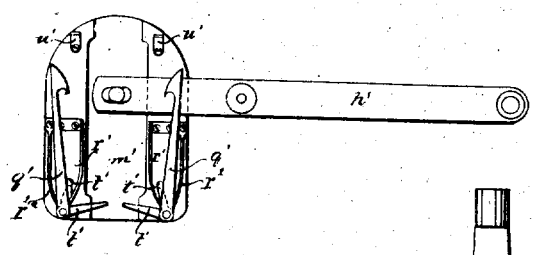
Figure 7:
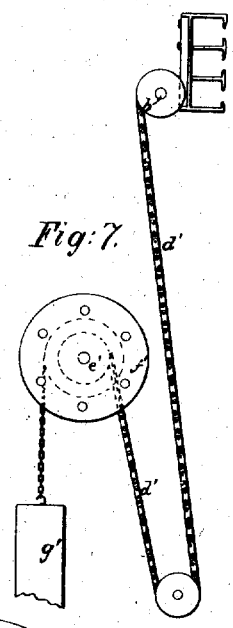
Figure 4:
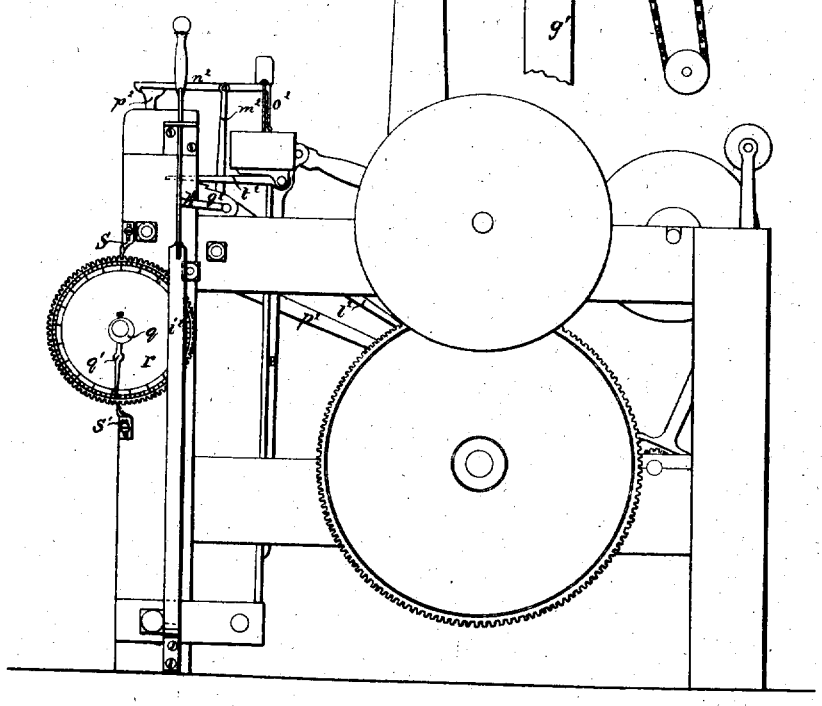
Figure 14:
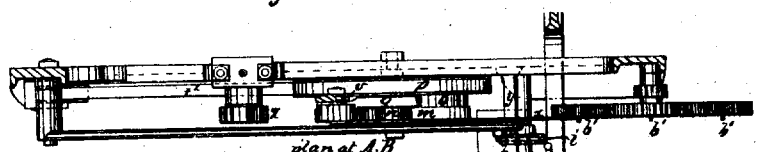
Figure 13:
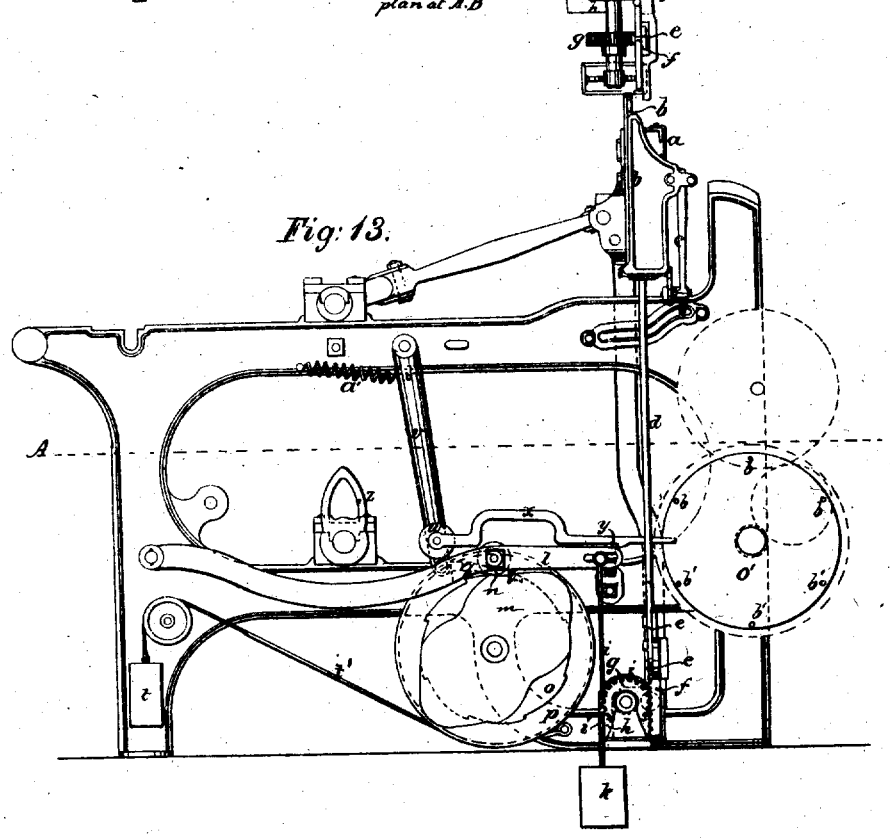

Figure 1 is an elevation of the left-hand end of a loom on my improved plan; Fig. 2, a front elevation; Fig. 3, a vertical section; Fig. 4, an elevation of the right-hand side; Fig. 5, a section representing a modification of a part of the apparatus for shifting the shuttle-boxes; Fig. 6, a separate view of the lever and weight for operating the shuttle-boxes; Fig. 7, a separate view of the shuttle-boxes, chain, wheel, and weight; and Figs. 8, 9, 10, and 11, back, front, top, and end views of the series of shuttle-boxes.

The same letters indicate like parts in all the figures.

The first part of my invention, which relates to the method of regulating the delivery of the warps, consists in regulating the delivery of the warps as required for weaving the cloth by the tension of the unwoven warps, in combination with a brake or stop motion which prevents the tension given to the warps by the beat of the lay in beating up the cloth from affecting the machinery which delivers out the warps.

The second part of my invention consists in combining with the method of regulating the delivery of the warps as required for the weaving of the cloth by the tension of the warps and controlled by a brake, the taking up of the woven cloth by a regular and positive motion, so that the same number of beats of the lay will produce a given and measured length of cloth that the figures produced thereon may match, the irregularities of the weft being by this means taken up in the thickness of the cloth instead of varying the length thereof.

The third part of my invention, which relates to the measurement of the quantity of cloth woven, consists in combining with the roller of a regular and positive take-up motion an index-wheel and hand or pointer.

The fourth part of my invention, which relates to the method of shifting the shuttle-boxes up and down for changing the shuttles when a change of color is required in the fabric, consists in operating the shifting mechanism by means of the gravitating force of a weight, or the equivalent thereof, whether for raising or depressing them, whereby no injury can be done to any portion of the mechanism should anything interrupt the motions of any of the moving parts.

The fifth part of my invention, which relates to the arresting of the momentum of the shuttle when it enters the box and to the relieving of the picker from the end of the shuttle preparatory to the shifting of the shuttle-boxes, consists in combining with the picker a lever, one arm of which runs in a curved or diagonal slot as the lay beats back and forth, so as to give an out-and-in motion to the spring-arm of the lever against which the picker strikes and rests; and the last part of my invention, which relates to the stopping of the loom when the weft-thread breaks or gives out, consists in employing a lever, or its equivalent, against which a stop or spur on a wheel or shaft of the loom strikes to arrest the motion of the moving parts, when this is combined with fingers which pass through corresponding apertures in the lay and at the end of reed, so that when the weft-thread is carried through and prevents the fingers from entering the lay they shall be carried forward, and so operate the stop-lever as to prevent it from stopping the loom.

On one end of the yarn-beam *l'* there is a spur-wheel, *a*, the cogs of which are engaged by the threads of a worm (represented in Fig. 1 by red lines, as it is behind the frame-work of the loom) on a vertical shaft, *b*, and on the lower end of this shaft there is a crown ratchet-wheel, *c*, operated by a hand or pawl, *e*, (see red lines in Fig. 1,) the forward end of which is jointed to and operated by the lay, so that at every beat of the lay the hand or pawl *e* is moved a given distance, and if permitted to rest on the teeth of the ratchet-wheel would turn it a given distance at each operation, and by the worm on the upper end of its shaft and the spur-wheel *a* give the required delivery motion to the yarn-beam, and thus give out the warps. The range of motion of the hand or pawl *e* and the parts connected with the yarn-beam should be such as to give to the yarn-beam the greatest amount of motion which may be required for any one beat of the lay; but as it is necessary in the weaving of many kinds of fabrics to have the cloth regularly taken up by a measured motion, that the figures along the entire piece may match, and the varying thickness of the weft in this condition of things will require a varying supply of warps, I pass the warps from the yarn-beam, on their way to the harness, over a roller, *l*, which I denominate a "tension-roller." This roller has its bearings in the upper end of two levers, *k' k'*, that turn on stud-pins attached to the frame, as shown by dotted lines, and the lower arms of these levers have each a segment-rack, *k*, the cogs of which engage a pinion, *i*, on a horizontal shaft, *h*, which carries an arm, *g'*, (see dotted lines in Fig. 1,) to which is suspended by a chain, *f*, the hand or pawl *e* of the delivery motion, so that whenever the tension-roller *l* is drawn back beyond a given point the hand or pawl is lifted from the ratchet-wheel and the delivery of warps is arrested; but when the said tension-roller is drawn forward by the tension of the warps the sector-racks act on the pinion *i* to depress the arm *g'*, which sets the delivery motion in operation to deliver out the warps.

For the purpose of keeping the warps under the required tension, the tension-roller is drawn back by a constant force applied by means of a weight, *n*, on the end of a strap which winds around and is attached to the periphery of a wheel, *m*, on the shaft *h* of the pinions *i i*, so that this weight constantly draws the roller *l* back against the pull of warps, and it is only when the tension of the warps becomes too great—that is, greater than the force due to the weight—that the roller *l* is drawn forward to set the delivery motion in action to give out the required supply of warps. In this way the supply of the warps is regulated in the quantity required for the forming of the cloth. As the beat of the lay exerts a considerable force, which might affect the position of the tension-roller and make it set the delivery motion in action when not required, a rod, *p*, is jointed at its forward end to the lay and at the back end to a friction strap or brake, *o*, which passes around a portion of the periphery of the wheel *m*, so that as the lay beats up the brake is brought up against the periphery of the wheel *m* and there holds all the parts connected with the levers of the tension-roller and prevents it from yielding to the pull of the warps when the cloth is "beat up." The woven cloth, after passing over the breast-beam, passes between two calender-rollers, A B, one of which receives a regular and positive motion to take up a given length of cloth for each beat of the lay from a cog-wheel, *t*, on its shaft, which engages another wheel, *u*, that in turn receives motion from a pinion, *v*, on a large spur-wheel, *w*, the cogs of which engage the threads of a worm, *x*, on one end of a line-shaft, *y*, which receives motion by two bevel-wheels from the main shaft of the loom. On the opposite side of the shaft of the calender or measuring roller A is an eccentric, *q*, which turns freely in a wheel, *r*, whose face is marked off into equal divisions, and with cogs on its periphery, and in front is suspended an index hand or pointer, *q'*, to indicate by the divisions the quantity of cloth woven. By reason of the eccentric connection with the shaft of the measuring-roller the wheel *r* vibrates up and down as well as laterally. There are two stationary spurs or cogs, *s s'*, attached to the frame, one above and the other below the wheel *r*, and so placed relatively to each other and to the eccentricity of the wheel that when the wheel is forced up to its highest position the upper spur, *s*, is in one of the cogs of the wheel, while the lower one, *s'*, is just clear of the points of the cogs, so that as the wheel begins to descend it also moves laterally and one of its spaces comes over and on the lower spur as the upper part of its periphery leaves the upper spur. The lower spur then becomes the fulcrum on which the wheel turns during the remaining portion of the rotation of the measuring-roller, and hence the upper part of the periphery of the wheel moves forward one cog relatively to the upper spur, that it (the upper spur) may enter the cog next to the one previously occupied, which in turn becomes the fulcrum for shifting the cogs on the lower spur. In this way the wheel is turned one cog for each rotation of the measuring or cloth roller, the circumference of which, together with the distance apart of the cogs and the divisions of the measuring-wheel, will give the exact measure of the quantity of cloth woven.

Each end of the lay represented in the accompanying drawings is formed to receive a plate, A, which is free to slide up and down in ways. To the front face of this is attached four plates, 3 3 3 3, (see Fig. 11,) which constitute the series of shuttle-boxes; these plates having flanges 4 4 4 4 at their front edge to guide the shuttle, leaving sufficient space between for the picker, and to the back face of this plate A is attached the usual shuttle, and it is further formed with two vertical racks, *a' a'*, for shifting the shuttle-boxes by means of two pinions, *c'*, (one only shown in the drawings,) on a shaft, *b'*, back of the lay and having its bearings therein. The weight of the shuttle-boxes tends constantly to carry them down when the shaft *b'* is liberated; but for elevating them there is a wheel, $b^2$, on the shaft *b'*, to which is attached one end of a chain, *d'*, which winds partly around it and then passes down around a wheel, $b^3$, at the lower part of the frame, and thence the chain passes partly around and is secured to a wheel, $e'$, (see dotted lines on Fig. 7 and red lines on Fig. 1.) on the same arbor with a wheel, $f'$, a counter-weight, $g'$, being suspended to a chain, which is attached to and winds around part of the circumference of another wheel on the same arbor in part to balance the weight of the shuttle-boxes. Whenever, therefore, the wheel $f'$ is turned in the direction of the descent of the counter-weight $g'$, the shuttle-boxes are elevated, and vice versa; and for the purpose of turning the wheel $f'$ to shift the shuttle-boxes it is provided with a series of pins, $f^2$, that project from its outer face at equal distances apart, and these are caught at the required periods of time by either of two hooks, $q'$ $q^2$, (see Fig. 6,) jointed at their lower ends to the inner face of a weight, $m'$, which slides vertically on a bar, $p'$, attached to the frame of the loom. Each of these hooks is acted upon in opposite directions by two springs, $r'$ $r^2$, (see Fig. 6,) so that when under the tension of both sets of springs they remain in the position represented in Fig. 6, and will not act on the pins of wheel $f'$; but when the tension of the inner springs, $r'$ $r'$, is removed they are forced inward by the outer springs, $r^2$ $r^2$, and catch onto the pins of the wheel to turn it. The tension of the inner springs, $r'$ $r'$, is removed from either one of the hooks at the required time by either of two small bent levers, $t'$ $t'$, that turn on stud-pins projecting from the inner face of the weight $m'$, the upper arm of these levers having a projection which lies between the hook and the spring, and the lower arm extending inward toward the middle of the weight nearly in a horizontal position. The weight $m'$, with the appendages above described, is moved up and down to operate the pin-wheel $f'$ by a lever, $h'$, to one end of which it is jointed, the said lever resting on the periphery of a cam, $n'$, on the cam-shaft $o$ of the loom, so that at each rotation of the cam-shaft the weight $m'$ will be elevated and depressed; but so long as the hooks $q'$ $q'$ of this weight are kept under the tension of both sets of springs they will not operate the pin-wheel $f'$ to shift the shuttle-boxes, and therefore during the continuance of this state of things the same shuttle will be used in weaving the cloth. When the cloth requires a change of weft, the shuttle-boxes must be shifted, and to do this one of the bent levers $t'$ must be operated, that one of the hooks $q'$ may catch one of the pins $f^2$ to turn the wheel $f'$ the required distance to bring another shuttle in the line of the race-board of the lay. For this purpose there are two arms, $w'$ $y'$, each with a projection, $w^2$, (see separate Fig. 1^A,) against which, when in the proper position, the lower arms of the levers $t'$ $t'$ catch as the weight $m'$ approaches the end of its upward movement, that the hooks $q'$ $q'$ catch into the pins of the wheel $f'$, and thus enable the weight on its return downward movement to turn the wheel, the gravity of the weight being sufficient for that purpose. The arms $w'$ $y'$ are each on arbors $v'$ $v^2$, the one passing through the other, that they may have the same axis of motion and be free to turn independently of each other. The arbor $v'$ carries another arm, $x'$, and the arbor $v^2$ another arm, $z'$, and the upper ends of these two arms $x'$ $z'$ bear against the face of the wheel $w$, described in connection with the take-up motion for taking up the woven cloth by a positive and regular motion, and on the face of this wheel are two series of projecting cams or tappets, $w^3$ $w^4$, of such form and arranged at such distance from the axis of the wheel that the series $w^3$ will act on the arm $z'$ and force out the arm $y'$ to operate one of the hooks $q'$, and the series $w^4$ on the arm $x'$ to force out the arm $w'$ to operate the other hook $q^2$. The arbors $v'$ $v^2$ and the arm on them should be provided with springs $x^2$ $x^2$, to press the arms $x'$ $x'$ against the face of the wheel. The arrangement of the tappets or cams on the wheel $w$ will determine the shifting of the shuttle-box, for whichever of the arms $x'$ or $z'$ is forced out by the tappets will by the connections described bring into action the corresponding hook, $q'$, to turn the wheel $f'$ and either elevate or depress the shuttle-boxes. The mechanism, however, only puts the parts in connection for the action of the weight $m'$, which, in descending by gravity, shifts the shuttle-boxes, so that if there should be any impediment to the movement of the shuttle-boxes—such as the projection of the point of the shuttles beyond the boxes—no injury will be done, as the weight by its gravity has only sufficient force to move the boxes when unimpeded. For the purpose of relieving the picker from the point of the shuttle there is a bent lever, $a^2$, jointed to the end of the race-beam, the vertical arm of which lever is made sufficiently thin to spring, and is so placed outside of the picker that when the shuttle is driven in the box it shall have the effect to arrest the picker. The other arm of this lever $a^2$ runs in a horizontal direction, or nearly so, and its end, as the lay beats, runs in a slot made in a plate, $c^2$, attached to the side of the frame, and the form of this groove is such that as the lay moves forward the spring-arm is moved back to relieve the picker from the end of the shuttle, that it may be fully relieved before the shuttle-boxes are shifted. During the back beat of the lay the arm moving in the slot gives to the spring-arm the reverse motion to bring the spring-arm in the proper position to arrest the picker at the next operation. When the weft-thread breaks or is exhausted, the belt is shifted to the loose pulley and the momentum of the machinery arrested at a given and determined point by the following means: On the crank-shaft there is a wheel, $e^2$, with a spur or cog, $f^3$, projecting from its periphery, (see dotted lines in Fig. 3,) for a purpose to be presently described. To the frame of the loom under the breast-beam a short stout lever, $g^2$, is jointed, from which there is a projection on the side opposite to that shown in Fig. 3, and represented in Figs. 2 and 4 at $h^2$. This extends beyond the side of the loom, and turns forward toward the spring-shipper $i^2$, of common construction. The lever $g^2$ is held a little inclined toward the lay by means of a strong spring, $k^2$, affixed to the frame that rests against said lever, as is clearly represented in Fig. 3. A hand or protector, $b^2$, is jointed to to the lever $g^2$ near its upper end, that extends back a little, inclined downward toward the lower edge of the wheel $e^2$. It is guided by a projection from the frame in which there is a slot to allow the lower end of the protector to rise and fall. A quadrant-lever, $m^2$, is situated just behind the upright lever $g^2$, the horizontal arm of which extends back under the protector $b^2$. Its vertical arm projects above the breast-beam between it and the lay. To the upper end of $m^2$ a horizontal lever is jointed near its center, on the end of which next the lay are four fingers (more or less) that turn down at right angles. (Some of these are seen in Fig. 2.) At the end of the reed and opposite the fingers are several large dents which, when the lay comes up, go in between the fingers above named, if they are not carried forward by thread. A hook is formed on the forward end of lever $n^2$, that when the loom is to be stopped catches on the upper end of a bent lever, $p^2$, that projects up through a slot, $x$, cut in the breast-beam. From its fulcrum lever $p^2$ extends back down to the cam-shaft $o'$, when it comes in contact with a cam, $q^2$, that raises it at every revolution or every other beat of the lay.

The operation of this apparatus is as follows: While the filling remains whole it is drawn by the shuttle across the dents at the end of the reed above named, and prevents the fingers $o^2$ from passing through between them. This, as will be seen, raises the hook at the other and clears it from the end of lever $p^2$, and the loom goes on; but if the filling breaks or is exhausted, so as not to cross the dents in the reed, the fingers $o^2$ pass through them, and the hook on $n^2$ catches on the end of lever $p^2$, and as the cam $q^2$ raises its lower arm it carries forward the upper one on which the hook is caught, and with it levers $n^2$ and $m^2$, raises the horizontal arm of the latter and brings the protector $b^2$, that rests thereupon, up so as to be struck by the tooth or spur $f^3$ on the wheel $e^2$ on the crank-shaft and arrests the motion of the loom by the momentum-lever $g^2$, with the spring $k^2$, that bears against it is forced forward against a stop, $s^2$, on the frame, and the projection $h^2$ knocks off the shipper $i^2$ and changes the band from the fast to the loose pulley, while the recoil of the spring $k^2$, that was set by the forward motion of the lever $g^2$, throws back the lay and opens the shed. On the upper end of $g^2$ a notch, $g^3$, is cut, (see Fig. 3,) into which the common protector $t^2$ on the protector-rod of the lay catches and stops the loom in the same manner, when the shuttle is not sent home into the box, as in the ordinary loom.

Instead of employing the gravity of a weight to shift the shuttle-boxes either up or down, a spring-connection may be substituted, as represented in Fig. 5, in which the lever $h'$ is moved up and down by a cam, $n^3$, which, instead of being a surface-cam, like $n'$, above described, simply to lift the lever, is formed with a cam-groove (see dotted lines) which embraces a roller on the lever, and the lever $h'$ has a square stud, $h^3$, projecting from it, which is embraced by two springs, $i^3$ $i^3$, attached to a weight, $m^3$, which corresponds with the weight $m'$, before described, and having the same connection with the shifting apparatus. As the lever is carried down by the cam-groove, if there should be any impediment to the motion of the shuttle-boxes, the springs $i^3$ $i^3$ will simply yield to the stud-pin $h^3$ and permit the lever to descend without the weight, and thus prevent the breaking of the machinery.

It will be obvious that the various parts of my invention may be changed and modified without avoiding the principle of my invention—as, for instance, under the first part of my invention any other mechanical equivalent means may be substituted for the tension-roller, so as to make the tension of the warps regulate the action of the delivery motion to give out the warps as required by their tension, and any kind of delivery motion may be substituted for the one described, as the delivery motion itself is not of the essence of my invention, which consists simply in regulating its action by the tension of the warps. And so of the second part of my invention, it is immaterial what kind of regular and positive motion may be employed for taking up the cloth, so long as this is combined with the regulating of the delivery of the warps as required by their tension.

As to the third part of my invention, any other measuring-wheel and index may be substituted as the equivalent of the one described when used in combination with the roller of a regular and positive take-up motion.

In reference to the fourth part of my invention, the modification of the principle described above, and represented in Fig. 5 of the accompanying drawings, will clearly show the modifications of which the principle is susceptible. As to the fifth part of my invention, the thing claimed being simply an improvement on a method of effecting the same end previously patented by me, I do not claim the broad principle. And, finally, as regards the last part of my invention, it will be obvious that the arrangement of levers described above for so operating the stop-lever by the fingers that whenever the weft-thread is carried through it shall not come in contact with a spur or its equivalent, may be variously modified without changing the principle of my invention. Nor does the kind of spur or its location, or the kind of stop-lever or fingers, partake of the essence of my invention, and therefore so long as mere equivalents are substituted for the elements of the combination the principle will be the same.

What I claim as my invention, and desire to secure by Letters Patent, is—

1. Regulating the delivery of the unwoven warps, as required for the weaving of the cloth, by the tension of the said warps, substantially as described, in combination with a brake or stop motion, substantially as described, to prevent the tension given to the warps by the beat of the lay from affecting the delivery motion, as set forth.

2. In combination with the method of regulating the delivery of the warps by their tension, and controlled by a brake, the taking up of the woven cloth by a regular and positive motion, substantially as described, that the figures produced thereon may be regular and well matched, the irregularities of the weft-threads being by this means taken up in the thickness instead of the length of the cloth.

3. In combination with the roller of a positive and regular take-up motion of a weaving-loom, the measuring-wheel and hand or pointer, operated substantially as described, whereby the quantity of cloth woven is at all times indicated, as described.

4. Communicating the shifting motion for shifting the shuttle-boxes up and down when a change of color is required in the weft by the gravitating force of a weight, or the equivalent thereof, substantially as described, whereby all injury to the mechanism is avoided should anything be interposed to arrest the motions of the moving parts, as described.

5. Arresting the motion of the shuttle and relieving the picker from the end thereof preparatory to the shifting of the shuttle-boxes by combining with the lay and picker a spring-lever, one arm of which moves in a slot, or the equivalent thereof, to give it the required motion, substantially as described.

6. Stopping the loom and arresting the momentum of the moving parts at a given and determined point by means of a lever which, when the weft-thread is not carried through, is brought into contact with a spur on the crank-shaft, or the equivalent thereof, which forces it back to shift the belt, when this is combined with the fingers which enter recesses in the lay, and which, when the weft-thread is carried through, are pushed forward to prevent the lever from stopping the loom, as described.

E. B. BIGELOW.

Witnesses:
C. W. M. KELLER,
M. GRANDIN.